(12) United States Patent
Plymoth et al.

(10) Patent No.: US 8,594,625 B2
(45) Date of Patent: Nov. 26, 2013

(54) CHARGING IN AD-HOC COMMUNICATION NETWORKS

(75) Inventors: Anders Nilsson Plymoth, Lund (SE); Bjorn Plymoth, Lund (SE); Amelie Plymoth, Lund (SE)

(73) Assignee: Belleshill AB, Lund (SE)

( * ) Notice: Subject to any disclaimer, the term of this patent is extended or adjusted under 35 U.S.C. 154(b) by 534 days.

(21) Appl. No.: 12/441,759

(22) PCT Filed: Oct. 11, 2007

(86) PCT No.: PCT/SE2007/000894
§ 371 (c)(1),
(2), (4) Date: Mar. 18, 2009

(87) PCT Pub. No.: WO2008/044983
PCT Pub. Date: Apr. 17, 2008

(65) Prior Publication Data
US 2009/0270069 A1    Oct. 29, 2009

(30) Foreign Application Priority Data
Oct. 11, 2006  (SE) .................................. 0602134-9

(51) Int. Cl.
*H04M 11/00* (2006.01)
*H04M 15/00* (2006.01)
(52) U.S. Cl.
USPC ............................ 455/407; 455/408; 379/140
(58) Field of Classification Search
USPC .................. 455/405–409, 414.1, 432.1–433; 379/114.01–114.2, 130, 140
See application file for complete search history.

(56) References Cited

U.S. PATENT DOCUMENTS

| 5,915,226 | A  | * | 6/1999  | Martineau ...................... 455/558 |
| 6,332,579 | B1 | * | 12/2001 | Ritter ............................. 235/492 |
| 2002/0022472 | A1 |  | 2/2002  | Watler et al. |
| 2002/0039900 | A1 | * | 4/2002  | Wiedeman et al. ........... 455/428 |
| 2003/0054795 | A1 | * | 3/2003  | Tamaki et al. ................ 455/406 |
| 2004/0165543 | A1 | * | 8/2004  | Nakazawa ..................... 370/252 |
| 2006/0223495 | A1 | * | 10/2006 | Cassett et al. ................ 455/405 |

FOREIGN PATENT DOCUMENTS

EP   1 339 210 A1   8/2003
WO   98/21874       5/1998

OTHER PUBLICATIONS

International Preliminary Report on Patentability corresponding to PCT/SE2007/000894 mailed Apr. 23, 2009.
Written Opinion corresponding to PCT/SE2007/000894 mailed Jan. 9, 2008.
International Search Report corresponding to PCT/SE2007/000894 mailed Jan. 1, 2008.

(Continued)

*Primary Examiner* — Marisol Figueroa
*Assistant Examiner* — Erica Navar
(74) *Attorney, Agent, or Firm* — Renner, Otto, Boisselle & Sklar, LLP

(57) ABSTRACT

Charging is enabled in ad hoc networks, without access to external infrastructure networks. For example, when a communication is initiated by a mobile communication device within an ad hoc network, a small initiation fee is stored securely on the device, typically on a smart card. Transfer of the charging information may then occur more or less automatically and/or when the device reaches a coverage area of the operator network. The invention is also advantageous for charging in cellular and/or wireless networks, as charging can be performed with low administration costs.

45 Claims, 10 Drawing Sheets

(56) References Cited

OTHER PUBLICATIONS

Sheng Zhong et al. "Sprite: A Simple, Chest-proof, Credit-based System for Mobile AD-HOC Networks". In: IEEE Twenty-Second Annual Joint Conference of the IEEE Computer and Communications Societies. Infocom 2003. Mar. 30-Apr. 3, 2003, vol. 3, pp. 1987-1997, INSPEC AN: 7853885, see col. 1-col. 8, abstract.

Din guide till kostnadsbevakning fran Vattenfall. Vattenfall AB Forsaljning Sverige, [on line] May 27, 2004 [retrieved on Mar. 21, 2007] Retrieved from the Internet: <URL: http://www.vattenfall.se/downloads/mobiltelefoni/guide_kostnadsbevakning.pdf>, see column 3.

* cited by examiner

CHARGING IN AD-HOC COMMUNICATION NETWORKS

FIELD OF THE INVENTION

The present invention relates to wireless communication and in particular to charging of resource usage in connection with communication in ad hoc networks.

BACKGROUND

A mobile ad hoc network, MANET, is a communication network that is formed in a more or less spontaneous way and comprises an arbitrary number of participating nodes. It typically comprises wireless communication terminals forming a wireless stand-alone network that is not dependent upon any external network infrastructure. Major motivations for using ad hoc networks include ease and speed of deployment, and decreased or non-dependence upon any infrastructure.

An important property of ad hoc networks is that terminals are able to communicate with each other directly, either through a direct communication from terminal to terminal, or from one terminal to another using other terminals. Terminals participating in the network relay information destined to other terminals in the network. A terminal is here defined as any device, or part of a device, that is able to communicate with other devices, or parts of devices. In the same way, a mobile terminal is defined as a terminal that is either completely mobile, or part of another device, for example a vehicle, that is mobile.

By the introduction of future networks, using technologies such as Ipv6, a larger address space will be available that, together with other future network features, will make ad hoc networks easier to configure and administrate, and therefore more and more attractive.

There are many situations where an ad hoc network may be useful. People meeting at a conference might want to exchange information such as files or documents, without the need for any cables and cumbersome configurations. Search and rescue operations may involve the need to quickly set up a communication network in situations where none or very little communication infrastructure is available.

There are also more common civilian applications to ad hoc networks. Ad hoc networks and their capabilities have the potential of establishing communication networks between users in ways that are being done today in cellular and/or wireless networks. In some places and situations ad hoc networks may provide the capabilities and possibilities of extending, complementing, or even replacing cellular and wireless networks. If an event occurs that causes a lot of people to gather in a certain area that normally is sparsely populated, or even unpopulated, a cellular or wireless network might not be existent, or have enough resources to handle the increased and spontaneously newly formed demand. An ad hoc network can in a situation like this automatically be formed between every communication device, thus replacing the need for other network infrastructures.

Wireless mesh networks resemble ad hoc networks and have the same network properties, except that nodes are not moving. Mesh networks can therefore be regarded as static ad hoc networks. In this way mesh networks can be a more permanent form of ad hoc networks, which may be operated by a more permanent source of power, although this is not necessary.

Mesh networks can also be used as a wireless infrastructure, a wireless network where the infrastructure itself is wirelessly connected. This differs from how present cellular and wireless networks normally are organized, where access to the network within a cell or area is wireless, but where each cell is connected in a wired infrastructure.

One example of this is WiMax mesh networks, constructed with WiMax technology, which resemble static ad hoc networks and mesh network with a wireless infrastructure, with the addition of the static areas where mobility is possible. Access to such a network, or any other type described here, can for example be made with or without the aid of an ad hoc network.

Another example are the so called VANETs (Vehicular Ad hoc NETworks) where the mobile nodes may be different vehicles, such as cars, trucks, trains etc, that are interconnected by mobile networks of ad hoc type. These networks are characterized by the primary nodes, i.e. the cars, trucks etc, having a more permanent source of power and often better antenna capacity. Mobile nodes and user terminals such as mobile phones, PDAs, or other information equipments within the network, can then get access to different forms of information and communication services.

Other types of networks will gradually be developed in the years ahead, but the principle will be the same, the coordination of different types of networks in order to maximize the geographical coverage area and at the same time minimize costs of enlargement and maintenance, with constraints on acceptable or demanded quality of service and performance.

The innovation described below can with advantage be used in all these, both present and future, communication networks.

If we consider a situation in a normal urban area where we have a large number of users, we might consider another application of ad hoc networks, i.e. Metropolitan Area ad hoc Network, (MAN). If a sufficient number of users are willing to use their own devices and resources to participate in an ad hoc network, we may envision a scenario where communications such as voice calls, or some other form of data traffic, are taking place within the ad hoc network itself, instead of in the cellular or wireless network, if such a network exists. In situations like these, we should consider one important difference between these two types of networks. In a cellular or wireless network, an operator is responsible for providing and maintaining the infrastructure that enables the communications. However, building and maintaining a cellular and/or wireless network is an expensive business that is financed by users subscribing to the cellular or wireless services and paying a fee. If we on the other hand consider an ad hoc network formed in a spontaneous way by the users and their devices, the "infrastructure" of the ad hoc network is owned, or maintained by the users themselves. It is therefore natural to assume that since users are using their own resources to maintain the network, they may also be allowed to operate within the network without charge. This may be considered as a situation involving a conflict of interest, regarding charging of communication, between network operators and providers on the one hand and individual users on the other hand. This problem is addressed by the present invention as will be discussed in the following.

Examples of charging procedures in ad hoc networks include published US patent application 2005/0220101. In US 2005/0220101 is described a method of performing charging and rewarding processes in ad hoc networks. Here, a network infrastructure plays a vital role in the handling of charging information, making charging difficult in stand-alone networks.

SUMMARY OF THE INVENTION

An objective of the present invention is to overcome drawbacks related to prior art involving charging of communication in communication networks, primarily in ad-hoc networks. Another objective is to develop a charging method for cellular and/or wireless networks with the advantage of low administration costs. This is achieved by way of methods, arrangements and computer programs according to the appended claims.

Hence, in a first aspect, a method is provided in a first mobile terminal for controlling charging of communication between the first mobile terminal and a second mobile terminal, the first mobile terminal being associated with a first network operator, the method comprising: generating charging information, the charging information being associated with communication between the first mobile terminal and the second mobile terminal, retaining the charging information in the first mobile terminal, and analysing a charging control profile in the first mobile terminal and depending on the analysis deciding whether or not to transfer the charging information to the first network operator.

The generation of charging information may involve: generation of charging information representing a chargeable activity relating to communication between the first and second mobile terminal such as an initiation of the communication between the first and second mobile terminal or the initiation and reception of the communication between the first and second mobile terminal and/or a duration of the communication between the first and second mobile terminal, and/or an amount of communication between the first and second mobile terminal.

The generation of charging information may be based on a prepaid billing system, such as a prepaid smart card, a subscription based billing system, or a combination of these two billing systems. Moreover, the generation of charging information may be joined with a billing system of an external communication system.

The retaining of charging information may involve storage in a protected storage area in the first mobile terminal, the storage area being protected from manipulation by a user of the mobile terminal, for example storage on a smart card, or a non-volatile memory of the first mobile terminal. Moreover, retaining of the charging information may involve storage on at least two smart cards of the first mobile terminal, said at least two smart cards being associated with a respective communication network.

In other words, charging is enabled in ad hoc networks, without access to external infrastructure networks. For example, when a communication is initiated by a mobile communication device within an ad hoc network, a small initiation fee is stored securely on the device, typically on a smart card. A typical place to store this kind of sensitive information is, for several reasons, a smart card. The main reason is that it will possible to store information in the card about charging information that can not be accessible for the common user of the device. The charging information doesn't necessarily have to be stored in a smart card as such, but may be implemented as a secure and encrypted depository within the operating system of the mobile device. In the case of a non smart card solution it should be guaranteed that it will not be possible for the user to access or modify the content of the depository. Such a solution may be seen as a "virtual" smart card, i.e. a smart card implemented purely in software or firmware.

The charging control profile may comprise information that specifies that transfer of the charging information is to take place at a specific instant in time.

The charging control profile may further comprise information that specifies that transfer of the charging information is to take place when the first mobile terminal has access to the first operator network.

In other words, if the terminal currently does not have any access to the network of the operator, the charging information stored in the terminal may be transmitted to the operator when the device again gains access to the network. If the device does have access to the network, the charging information may be transmitted as determined by the charging control profile specified by the operator. This could, for example, be immediately, every hour, every day or according to any other schedule as specified by the profile and considering optimal performance of the network and the system. That is, transfer of the charging information may occur more or less automatically and/or when the terminal reaches a coverage area of the operator network.

The generation and the retaining of the charging information may involve updating an available credit level and the updating of the available credit level may involve updating credit level data in the first mobile terminal.

The method may further comprise receiving credit level data from the first operator network.

In other words, the actual charging of the fee can be performed in a number of ways.

It is possible to use a charging system handled and controlled by the operator controlling the access, i.e. the issuer of the smart card. When the network system of the operator receives charging information from a communication device, e.g. when it again comes into contact with the infrastructure, the corresponding account is updated and charged with the activities that have occurred since the last update.

A credit based system may be used, where available credits are stored securely on the communication device, e.g. on the smart card. Every time a chargeable activity such as a communication initiation occurs, a credit, or an appropriate amount of credits, is deducted from the currently available credits. This means that organization for the actual billing is needed, and if the user has a prepaid smart card, the user can be denied access to the network when it runs out of credits, if the operator so chooses. In some cases the operator may even accept zero or negative credits. This method also introduces the possibility of charging for the communication without the need to ever contact the fixed infrastructure, because a prepaid system may be used. It further enables the operator to allow communications free of charge, as long as the initiating terminal and the receiving terminal have valid contracts, or only the initiating terminal has a valid contract, as determined by the real or virtual smart card.

A combination of these two ways of handling the actual charging is also possible. In such a combination, the number of credits used is stored in the terminal (e.g. the smart card), and the number of used credits is transmitted to the operator when it comes into contact with the operator, as specified by the charging control profile.

Moreover, when a terminal does have access to a network, the operator may load the smart card or secure credit storage area with an appropriate amount of credits, and charge for this through an appropriate billing method. The user may then continue to use the device until it runs out of credits, or runs out of negative credits, at which time it needs to refill its credits, for example by contacting the network for downloading new credits or by some other recharging method. The charging control profile, which may be configured by the user through setting in the terminal, may in this case specify when the device should contact the network for acquiring new credits. This could for example include a critical low credit level and a preferred credit level. These mean that when the credit level falls below the critical low credit level, the device will contact the operator whenever it has access to the network for recharging the credit level up to the preferred credit level. If the preferred credit level and the critical low credit level are set to the same level, the device will contact the operator as soon as possible after a previous communication, if the credit level is lower than the indicated level.

Such updating may be obtained, in another aspect of the invention, by the provision of a method in a mobile terminal for controlling a credit level associated with charging of communication in a network, the terminal being associated with a first network operator, comprising determining that the credit level is to be updated, based on the determination, accessing the communication network and requesting an updated credit level, and obtaining, from the communication network, an updated credit level.

Correspondingly, another aspect is that of providing a method in a communication network for controlling a credit level in a mobile communication terminal associated with charging of communication in the network, the terminal being associated with an operator of the network, comprising receiving a request regarding an updated credit level from the terminal, determining whether to accept the request, and depending on the determination, providing an updated credit level to the terminal.

Some operators or providers that also provide access to a fixed and/or stand alone infrastructure network, e.g. a cellular network operator or a provider of wireless internet access, may be interested in having a common payment structure for both the charging of ad hoc communications, and for infrastructure communications. For example, if the operator or provider applies some form of flat rate, the often associated initiation fee might be tied to both the ad hoc network and the fixed network. So, if an initiation fee has been deducted for a communication in the ad hoc network, and only one charged communication is credited in a certain time period, any subsequent communications within this time period in either the ad hoc or fixed network can be performed without charge. Other variations of this scheme are also possible. For example, one initiation fee for each type of communication, with the same or a different fee. We may also have a zero payment fee for communication in the ad hoc network. The only condition is that the initiating terminal and the receiving terminal have valid contracts, or only the initiating terminal has a valid contract, with at least one network operator.

It should be pointed out that the payment method presented herein does not rely upon the idea of an initiation fee, or a zero payment fee. This payment method can be also applied for rate based charging, such as per minute or second, and/or amount based charging. The only difference is that in that case, charging is performed after a communication, and the amount depends on the duration and/or the amount of the communication, as long as the resulting credit level is sufficient to sustain the communication. The payment method can also be applied for the case where normally both the initiating terminal and the receiving terminal are sharing the costs for communication. The only difference is that the initiating terminal and the receiving terminal are sharing the charging costs.

Everything else is the same, where credits are deducted from a securely protected real or virtual smart card.

The charging control profile may comprise information that specifies whether transfer of the charging information should be performed depending on whether an unplanned disruption of the communication between the terminals has occurred.

In other words, unplanned and unwanted disruption of a connection may also be handled. If a connection is disrupted due to some error in the network, perhaps in the middle of a voice communication, the user might not be willing to pay an additional connection fee just to continue the communication. If the user in this case immediately reinitiates the communication to the same destination, perhaps within a specified amount of seconds, the operator may choose to not charge for the new connection.

A similar kind of policy might be applied to a connection that is disrupted after only a few seconds. In this case the operator might choose not to charge for the connection; perhaps by not defining it is a communication at all. This would especially make sense if it were not possible to re-establish the connection.

Another case is when a group of users have a multi communication, for example a conference communication, where the initiating terminal is charged for the communication, or the initiating terminal and a subset of the group is charged, or the whole group is charged for the communication. This charging can use any type of billing system and individual charging levels (positive or zero). The only condition is that the initiating terminal has an agreement with at least one network operator, or the initiating terminal and a subset of the group have an agreement with at least one network operator, or the whole group has an agreement with at least one network operator.

The method may further comprise checking whether a respective agreement exists between the first mobile terminal and the first network operator and between the second mobile terminal and a network operator and depending on the result permitting or rejecting the communication. This typically involves checking information stored on a smart card and receiving information from the second terminal during signalling between the terminals.

Normal Authentication, Authorization and Accounting (AAA) is not performed for communications originating and terminating within the ad hoc network, and not crossing any external network infrastructure, but are subject to a Mutual Agreement (MA). The MA can be an agreement about paying a fee for example such as an initiation fee, or any type of relevant agreement such as an active subscription, between for example the subscriber initiating the communication and one network operator or network provider.

The MA can be seen as a contract between a subscriber and a network operator or network provider that allows the initiating subscriber to use its device in the ad hoc network for communication with other devices. The MA can be either a more permanent contract such as part of a subscription or a registration with an operator or provider, or part of a more temporary contract that is valid only for a certain specified duration.

The MA can be determined as inactive if the contract between the user and the network operator or provider is to be determined as invalid. This could for example be if the MA has expired, if a subscription related to the MP has expired, the user has a too low credit balance, or if any other part of the agreement can be determined to no longer being valid.

The mutual agreement (MA) can also be an agreement between participating subscribers, consisting in an agreement to only allow communications within the ad hoc network that originates from and to a subscriber with a current and active MA with at least one network provider or operator. This includes the case where normally both the initiating terminal and the receiving terminal are sharing the costs of communication like in the United States and between different countries. This will allow the creation of an ad hoc network consisting only of subscribers with active MAs.

Subscribers with no MAs will not be allowed to initiate any communications in the ad hoc network, and their communications will not be relayed by any subscribers.

Subscribers or users with no MAs, or with an inactive MA, may or may not be considered a part of the network, but their communications will not be relayed by any subscribers.

Subscribers with an inactive agreement (MA), or no MA, can be prevented by a mechanism implemented within the mobile communication device that disables any originating communications but allows incoming communications. Another alternative is to have a mechanism implemented within the network that prevents subscribers with inactive MAs from originating communications.

One type of ad hoc networks can be such networks that only operate within an operator's and/or a provider's allocated channel and frequency range. This can make the ad hoc networks more accessible and stable and also being specific for every operator and/or provider. The same solutions are possible as for operators and/or providers of the non-specific ad hoc networks. Non-specific operators can be such operators that use common and non-licensed channel- and frequency ranges, for example the ISM bands. Specific operators are such operators that operate on licensed channel- and frequency ranges. Different forms of cooperation agreements between operators and/or providers can enhance and widen the channel- and frequency ranges and therefore the specific ad hoc networks.

Yet another type of ad hoc network can be such networks that operate simultaneously within an operator's and/or provider's specific ad hoc network, as described above, and non-specific common ad hoc networks. The same solutions are possible as for ad hoc networks of the non-specific operators and/or providers.

A typical implementation of a method for controlling charging involving two terminals may for example hence comprise the steps: initiating a communication in the first mobile terminal; performing a credit level check in the first mobile terminal, the check setting a credit indicator; depending on said credit indicator, permitting or rejecting the communication; checking whether an active mutual agreement (MA) exists for the first mobile terminal and the second mobile terminal establishing, in the event of existing mutual agreement (MA), the communication between the first mobile terminal and the second mobile terminal; updating the credit level using the charging information.

A network operator may place support nodes at certain strategic locations in order to enhance the performance, structure and construction of an ad hoc network. These nodes can be deployed with permanent power in a permanent location. This is, in contrast to normal ad hoc nodes that are normally battery operated and very mobile, typically in the form of mobile communication terminals carried by a user. By placing additional support nodes in more permanent locations, the operator may both increase the connectivity of the ad hoc network and the possibility for more successful connections, as well as extending the lifetime of the network as a whole. By having more connections connecting through support nodes, less power will be consumed by the mobile terminals, thereby increasing the lifetime of their batteries. Longer lifetime of the mobile terminals will also translate to better long term connectivity of the network.

Fixed and/or mobile terminals with a fixed (constant or temporary) source of power may be regarded as "mini super nodes" if they are ad hoc configured, and they can then help the system to become more stable. This can be implemented as a technical solution in order to increase the capacity and performance of the system.

Hence, the communication between the first and second terminal may further include communication via at least one support node and comprising: receiving support node information including information regarding an association between the initiating terminal and an operator of the support node, analyzing the node information and, depending on the analysis, generating the charging information.

The analysis of the charging control profile may comprise analysing information that specifies an agreement between the terminal operator and the operator of the support node as well as information that specify that the generation of charging information include generation of a support node usage charge.

Furthermore, the generation of the charging information may involve generating the node usage charge in case the analysis of the node information establishes that the first terminal operator is not associated with the support node operator.

In other words, the support nodes may for example be used for free after an initial charge has been effectuated, and may or may not be used for free by subscribers of other operators. There are several considerations an operator might have when a user that is associated with another operator, (this can be more than one other operator), connects through one of its support nodes. An optimum solution from a user's point of view may be to always pay only one connection fee, regardless of whether the connection is through a competing operator's support node. This may be accomplished through an agreement between the two or more operators where they allow each others users to connect through their support nodes. This could mean that they all will benefit from the agreement, as it increases the possibility for the users of the operators to make more successful connections, which in turn would mean that they would receive higher incomes. It could also mean that they could plan the deployment of their support nodes together, in such a way that they can split the costs, while at the same time increasing the availability and connectivity for their users.

If a user wants to connect through a support node, and the operator with which the user is associated and the operator of the support node, don't have any agreement for splitting the costs; "nodeing" may be performed, similar to roaming in cellular networks. This means that before a device can complete a connection through a support node, a check has to be performed whether the subscriber belongs to the operator of the device, or what type of agreement that exists between the different operators. This check needs a secure technical solution that identifies the operators of the devices, and the operators of the support nodes, and any agreement between them if they differ.

In the case where the operators don't have any agreement about splitting the costs, the fee may be recorded in the originating terminal, e.g. on the smart card, with additional information about the parent operator of the support node.

The analysis of the node information may further involve establishing that a plurality of support nodes are involved in the communication and wherein the generation of the node usage charge involves generation of a node usage charge that depends on the number of support nodes involved.

In other words, as part of planning the deployment of support nodes and increasing its incomes, an operator may place a restriction on the number of support nodes a connection may pass through. If the terminal connects through more support nodes than this, the operator might charge a higher connection fee. This may increase the willingness of an operator to deploy more support nodes, as it would also mean a possibility for higher incomes. This could be seen as an extra incentive for the introduction of more support nodes, besides the positive effects the extra nodes would have in terms of increased robustness and stability of the ad hoc network.

The communication via at least one support node may be conditioned on results from an analysis of the maximum extra fee the terminal user is willing to pay for a connection through support nodes and the minimum capacity the terminal user is willing to accept of a connection through support nodes.

Furthermore, the communication may also be conditioned on the willingness of connecting through another external communication system and on the maximum extra fee the terminal user is willing to pay for a connection through the external communication system and the minimum capacity the terminal user is willing to accept of a connection through the external communication system.

User confirmation, via a user interface in the terminal, may be added in order to provide a user with an opportunity to view the conditions under which the communication will commence. During such interaction, the user may be presented with an option to select whether capacity or price has a higher preference.

In another aspect there is provided a method in a support node for controlling charging of communication between a first mobile terminal and a second mobile terminal, the first mobile terminal being associated with a first network operator, the method comprises providing, to the first terminal, support node information including information regarding an association between the operator of the initiating terminal and an operator of the support node. This information is then utilized in the terminal as described above.

The information regarding the communication between the first and second terminal may be logged for record keeping in a secure storage area inside the support node, wherein the logged records being configured to be retrieved remotely through the providers or operators network, the logged records being configured to be retrieved remotely through another providers or operators network, the logged records being configured to be retrieved remotely through an ad hoc communication network, and the logged records being configured to be retrieved locally at the support node by direct physical access to the secure storage area.

That is, the charging information may also be recorded on the support node, for record keeping and for eventual comparison of the actual received payments from other operators and their support nodes. The two or more operators, the one that the mobile terminal is using and the operator(s) that owns the support node(s), can then compare this information to make sure no illegal or unallowed activities have occurred regarding the use of the support nodes. This could for example be a malicious mobile terminal that has managed to modify its device to initiate communications without recording a fee. The two operators can then have agreements that describe how such a situation should be handled, for example banning the malicious terminals and decide about the costs of the malicious communications.

The information stored on the mobile device is eventually transported along with the other charging information when the terminal connects to the network of the operator with which the terminal is associated, where it is relayed to the operator of the support node.

If a credit based charging method is used, credits have been deducted directly from the real or virtual smart card, both for the use of the support node, and for the normal use of the system. Alternatively, credits could have been deducted according to an agreement between the two or more operators, which may or may not involve an inter operator agreement consisting in the splitting of incomes, or in some different way if another non smart card based charging method is used.

If a system is used that does not rely on any infrastructure at all, credits used by visiting devices is recorded on the support node. The operator of the support node can then collect these charges from the operator who issued the smart card. This will also allow both operators to validate and monitor the communication fees charged to the visiting devices, as the fee will be recorded both in the terminal which eventually will be transmitted to the terminal operator, and in the support node. Since the communication fees in this case are deducted directly in the terminal from the terminals available credits, this can prevent the overuse of support nodes by users that never, or very rarely, connect to the home operator network.

The terminal may comprise a profile that specifies the willingness of connecting through a support node, which will incur an extra fee. The system software of the terminal can also, typically if no profile is specified, present the user with a graphical interface for confirming the connection through the support node, or any alternatives, which may or may not have less capacity.

The terminal may also comprise a profile that specifies the willingness of connecting through another cellular or wireless system, if no contact is made through the ad hoc system, with or without the help of nodes. This connection to an external network such as a GSM, UTMS, WiFi, WiMax etc or a combination of these and future network technologies, which may connect through other support nodes and mobile terminals in the ad hoc network, both in the beginning of the connection and/or at the end of the connection, may incur an extra fee which the terminal profile specifies its willingness to pay. This extra fee could be deducted as described herein, or through some other payment method. If the profile is not set, the terminal software may still present the terminal user with a graphical user interface window, if the only option available for a successful connection is to connect through the external network for the higher fee.

The profiles might include options that specify the preferred capacity of a connection. In this case, capacity might come into conflict with price, as a connection with higher capacity might incur a higher price. An option could therefore also be included in the profile that states whether capacity takes priority over price. These options could be dependent upon the type of subscription the subscriber has. If the subscriber has a flat rate subscription, new connections may or may not be limited by the subscription in terms of maximum capacity or price.

In another aspect there is provided a method in a first network for controlling charging of communication between a first mobile terminal and a second mobile terminal, comprising receiving charging information from the first communication terminal, and analysing the received charging information.

The invention is advantageous in that it can provide a viable business model for network operators or providers in a situation where an ad hoc network can exist independently of any existing wireless and/or cellular network payment infrastructures. It can also be a substitute to these infrastructure networks. Examples of this could for example be somewhere people are gathered, such as a conference or a meeting. It is possible to think of a situation in which a large number of people have ad hoc terminals, that the ad hoc network may span a whole city, and become a metropolitan ad hoc network (MAN). In such a situation, a cellular or wireless network infrastructure is not even needed for many of the communications.

The invention is also advantageous in that it can provide a viable business model in a situation where a cellular and/or wireless network infrastructure coexists with or is complemented with an ad hoc network. This can be advantageous as the ad hoc domain can also relieve the cellular and/or wireless network during high load or congestion and can extend the cellular or wireless network into areas of no coverage, such as the outskirts of a city. It can also decrease the costs of building and maintaining an infrastructure, as less or simpler base stations or access points are needed to operate the network.

In situations as described above, users will typically have subscriptions to different cellular and/or wireless services and have devices that may be provided or subsidized by the cellular and/or wireless operator. Previously, an operator may have regarded free communications within the ad hoc network as a loss of incomes, and might therefore possibly have discouraged usage of an ad hoc network. A solution and settlement of this possible conflict is provided by the invention in that it allows the free communication within the ad hoc network, but for as an example, an initiation fee that may be independent upon the duration of the communication. This fee could be charged once per call, once per hour or once per day or something similar. This fee can, for example, be registered on the users smart card and transmitted to the operator the next time the users device comes in contact with the cellular or wireless network. If the initiation fee is for example up to the normal fee for opening a telephone call, this will be attractable for all parts and, it might draw more subscribers to the network, maybe even to the cellular and/or wireless network, which in turn will generate more incomes for the network operator.

While the described invention is advantageous for charging of, for example, an initiation fee, it should be noted that the invention might also easily be used for charging of the reception of communications. In that case, after a reception, the fee is charged and recorded securely on the receiving device in the same manner as has been described.

While the described method is advantageous for charging in ad hoc networks as it is not directly dependent upon a cellular or wireless network, and that it can operate independent of any cellular or wireless network, but with the supplement of a cellular and/or wireless network, it should be pointed out that it is also advantageous for charging in cellular and wireless networks. As charging can be performed within the terminal itself, or within a part of the network, or an isolated part of the network, charging can also be performed in a cellular and/or wireless network, by the described method with a low administration cost.

Communications originating in external networks could also be connected into the ad hoc network. This will make the ad hoc network solution a lot more attractive to operators and subscribers. If the external communication is originated from a subscriber of the same operator, but is located and attached to a completely different part of the operator network, more communications will now be possible and therefore more incomes will be generated for the operator and higher functionality for the subscriber.

BRIEF DESCRIPTION OF THE DRAWINGS

The invention will now be described in more detail by way of example and with reference to the attached drawings on which.

DETAILED DESCRIPTION

Figure 1:
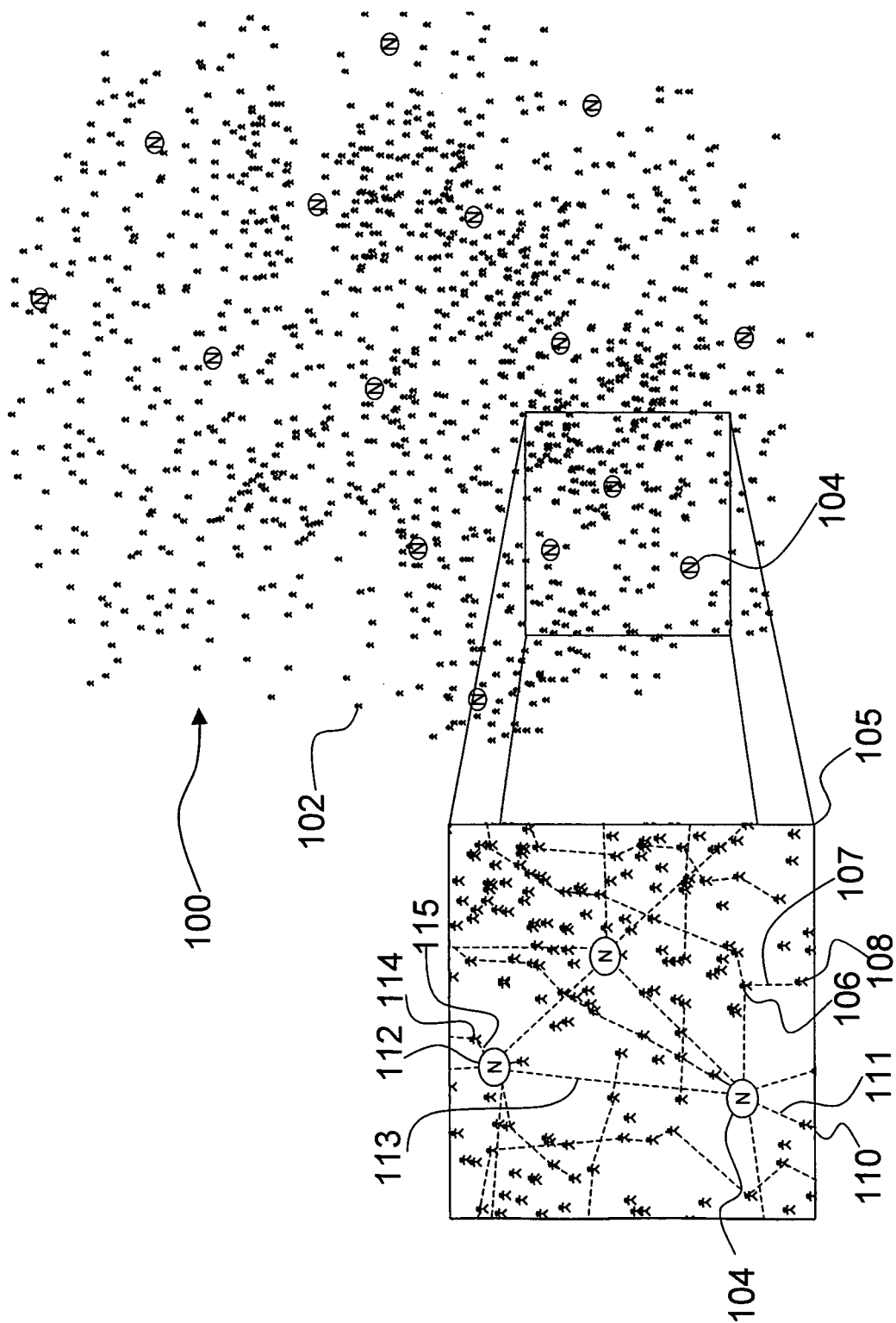
FIG. 1 shows schematically an ad-hoc network.

FIG. 1 illustrates schematically a geographic area 100 where a group of persons, as exemplified by the person identified by reference numeral 102, are gathered. The area 100 may or may not be located such that it is within a radio coverage area of a cellular and/or wireless communication network (not shown). A part 105 of the area 100 is drawn in a scale that enables illustration of more details.

Although not shown in detail, a number of persons are users of mobile communication terminals. The terminals are capable of communication in a cellular and/or wireless network as well as capable of communicating directly with other similar terminals in an ad hoc manner. Such terminals will be described in more detail below in connection with FIGS. 2 to 4. Examples of such terminals are users 106, 108, 110 and 114.

As illustrated by dashed lines, a number of users have established radio connections and are communicating with each other. The user 106 is communicating via a connection 107 with user 108. The user 110 is communicating with user 114 via two support nodes 104 and 112 by means of radio connection 110 between the user 110 and support node 104, radio connection 113 between the support nodes 104, 112 and radio connection 115 between support node 112 and the user 114. A support node, such as any of the support nodes 104 and 112, will be described in some more detail below in connection with FIG. 4.

As a person skilled in the art will realize, the group of persons, the support nodes and the connections between these that are illustrated in FIG. 1 is only an example of a collection of communicating entities. Larger or smaller, i.e. more or less numerous, collections of communicating entities are also possible. Any number of cellular and/or wireless communication networks, operated by any number of network operators, may also be located such that any number of the users are within radio coverage areas of such networks.

Figure 2:
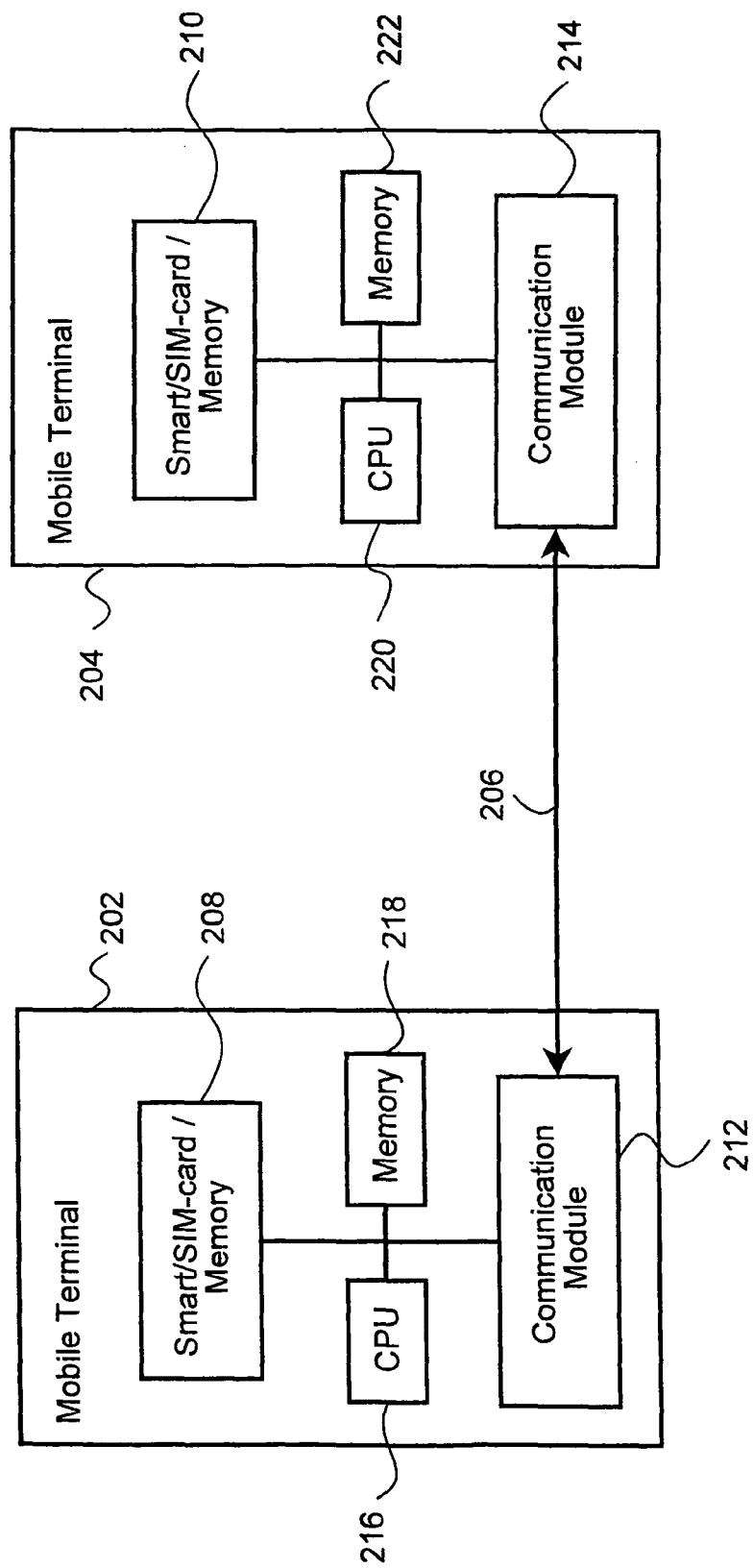
FIG. 2 shows schematically a block diagram of two mobile terminals.

FIG. 2 shows schematically two communication terminals, a first terminal 202 and a second terminal 204. Each terminal 202, 204 may, for example, be a mobile telephone or similar device and each terminal 202, 204 may be associated with a cellular and/or wireless network operator, i.e. being subscribers in a cellular and/or wireless network. The first terminal 202 may be associated with a first network operator and the second terminal 204 may be associated with a second network operator. Alternatively, both terminals 202, 204 may be associated with one and the same network operator.

Each terminal 202, 204 comprises a number of functional units of which only a respective communication module 212, 214, a respective control unit (CPU) 216, 220, a respective memory 218, 222 and a respective subscriber identity module (SIM) 208, 210 are shown. As a person skilled in the art will realize, the terminals 202, 204 typically comprise more functional units, such as user interface units in the form of keypads and display units, but these are omitted in the figures for the sake of clarity.

The two terminals 202, 204 are configured to communicate, via their respective communication module 212, 214, with one or more communication networks as is known in the art. Such cellular or wireless networks include networks that operate according to standards such as GSM, UMTS, WCDMA, CDMA2000, WiFi, WiMax etc, or a combination of these and future network technologies. The two terminals 202, 204 are also configured to communicate with each other, via their respective communication module 212, 214, as illustrated by a radio connection 206.

The operation of the terminals 202, 204 will be described below in connection with reference to flow charts in FIGS. 5 to 10, in terms of operational methods as implemented by computer software instructions. These software instructions are typically stored in the respective memory units 218, 222 and executed by the respective control units (CPUs) 216, 220.

The software instructions that implement the methods to be described form part of computer programs or computer program products, in the form of recording media such as diskette, CD/DVD, flash memory units etc. and/or as propagated signals that are transmitted via appropriate data communication channels to the terminals 202, 204, as a person skilled in the art will realize.

With regard to the operation of the subscriber identity modules (SIMs) 208, 210, these typically comprise information, as is known in the art, which pertain to identification and authentication when connecting to a cellular and/or wireless network. Such information is typically protected from manipulation. However, the subscriber identity modules (SIMs) 208, 210 are also configured to hold data pertaining to charging of the use of resources in a cellular or wireless network as well as data pertaining to charging of ad hoc connections, as will be described below. The charging data may be in the form of specific credit level data as well as more or less simple counters of resource usage.

In fact, for the purpose of the case at hand, the subscriber identity modules (SIMs) 208, 210 may be regarded as any protected memory unit that is configured to hold charging information.

Figure 3:
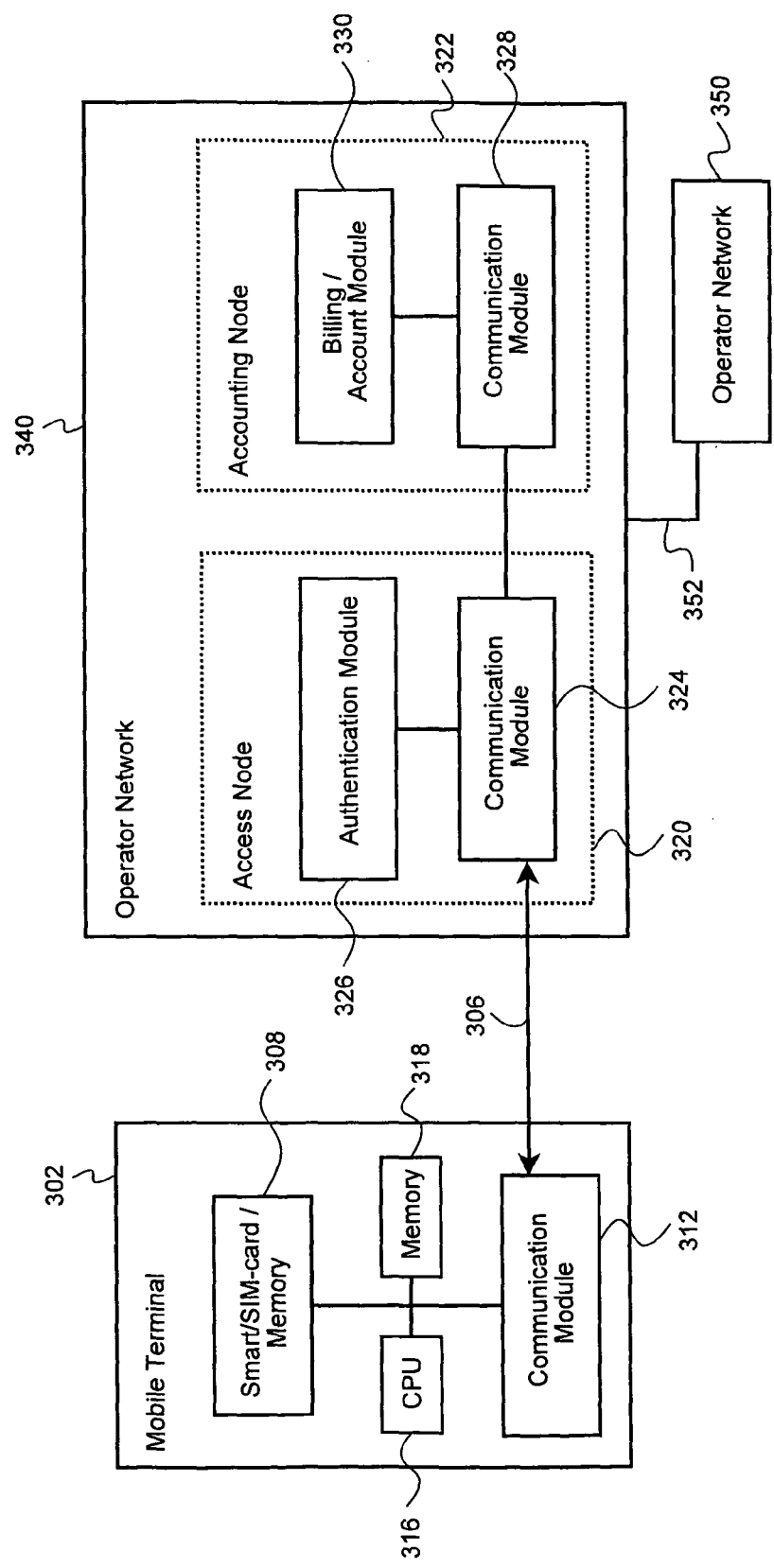
FIG. 3 shows schematically a block diagram of a mobile terminal and an operator network.

FIG. 3 schematically illustrates a mobile communication terminal 302 connected, via a radio connection 306, to an operator network 340. The terminal 302 is similar to the terminals 202, 204 described above in connection with FIG. 2 and comprises a number of functional units of which only a communication module 312, a control unit (CPU) 316, a memory 318 and a subscriber identity module (SIM) 308 are shown.

The operator network 340 may be of any type known in the art and may be a network that operates according to any of the standards GSM, UMTS, WCDMA, CDMA2000, WiFi, WiMax etc, or combinations of these and future type of network technologies.

The terminal 302 is in connection with an access node 320 in the network 340. Such an access node 320 may be, as illustrated in FIG. 3, one device but may alternatively (as suggested by the dashed line delimiting the access node 320) be a collection of functional units distributed across several devices in the network 340. The access node comprises an appropriately configured communication module 324 and an authentication module 326. The communication module is configured such that it is capable of maintaining the connection 306 with the terminal 302 according to the appropriate radio communication standard, as discussed above. The operation of the authentication module 326 will be discussed below in connection with reference to flow charts in FIGS. 5 to 10, in terms of operational methods as implemented by computer software instructions.

The access node 320 is in connection with an accounting node 322 via communication modules 324, 328. A billing/account module 330 is configured to handle information relating to charging, as will be described in some more detail below. Similar to access node, the accounting node 322 may be, as illustrated in FIG. 3, one single device but may alternatively (as suggested by the dashed line delimiting the accounting node 322) be a collection of functional units distributed across several devices in the network 340.

Needless to say, the access node and the accounting node comprise functional units that are not shown in FIG. 3, such as one or more processors and one or more memory units. That is, as a person skilled in the art will realize, these units as well as the network 340 on the whole comprise a plurality of other functional blocks that typically form part of an operator network. However, these already known functional blocks are omitted from the description, because a detailed description would clutter the description with unnecessary detail.

The network 340 may be connected to any number of other communication networks, including cellular networks as well as non-cellular networks. This is simply illustrated in FIG. 3 by a second operator network 350 that is connected to the operator network 340 via an inter network connection 352. As is known, the networks typically communicate and exchange data according to appropriate data communication standards.

Figure 4:
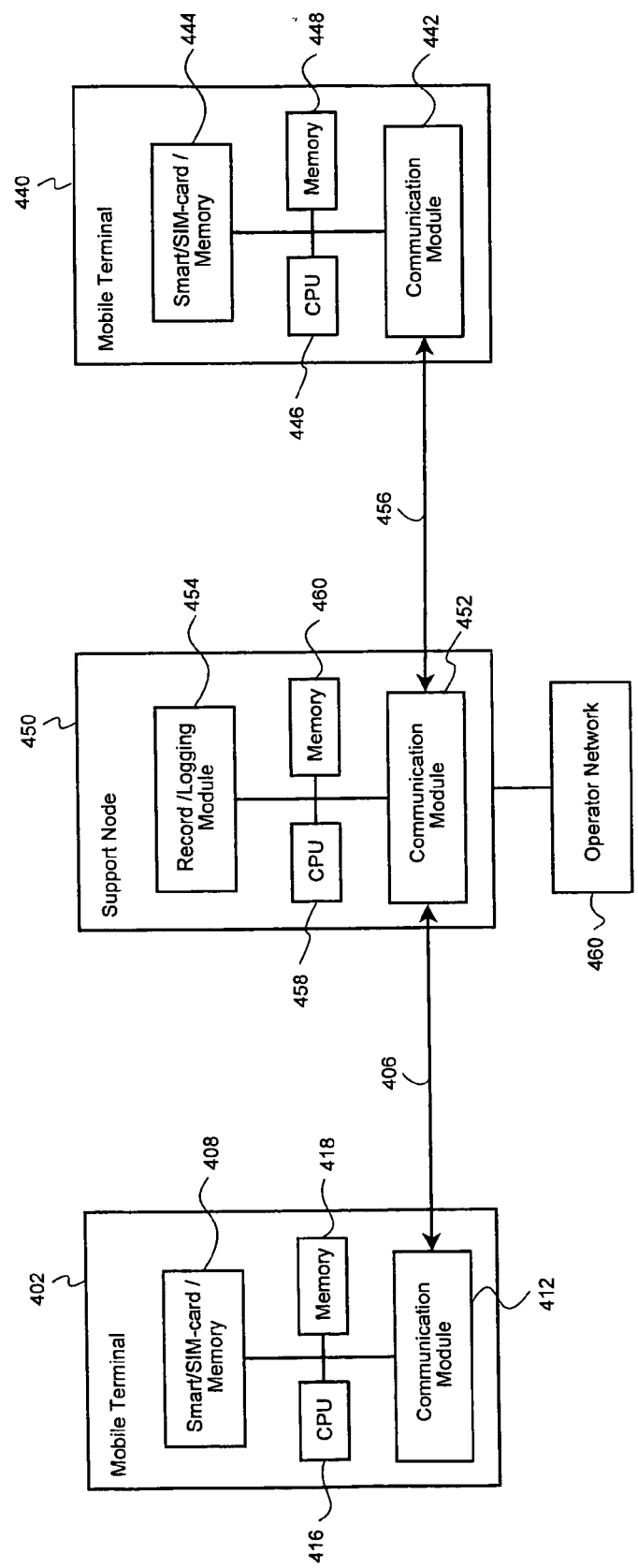
FIG. 4 shows schematically a block diagram of two mobile terminals and a communication support node.

FIG. 4 schematically illustrates two communication terminals 402, 440. Similar to the terminals 202, 204 described above in connection with FIG. 2, the terminals 402, 440 each comprises a number of functional units of which only a respective communication module 412, 442, a respective control unit (CPU) 416, 446, a respective memory 418, 448 and a respective subscriber identity module (SIM) 408, 444 are shown.

The two terminals 402, 440 communicate with each other via a support node 450 through air interface connections 406, 456. The support node 450 is connected to, and controlled by, an operator network, which may be one of the operator networks with which any of the terminals 402, 440 is associated or any other support node operator. It is to be noted that the support node may be configured such that it is not in permanent connection with an operator network, even though it typically is controlled by an operator. For example, it may be located at a remote location where no communication infrastructure is present, but where occasional visiting terminal users are present. These visiting users may then make use of the support node and the communications made by the user terminals are logged in the node. The operator that controls the support node then, typically at regular intervals, visits the support node and connects to the support node and retrieves the logged data, which subsequently is transferred to the operator for further processing. In other words, a continuous connection between a support node and an operator network is not necessary. Of course, continuous connection will facilitate administration of the usage of the support node. The way in which a user uses a terminal is thus completely independent of how the support node is administered.

The support node 450 comprises an appropriately configured communication module 452 and a record/log module 454. The communication module 452 is configured such that it is capable of maintaining the connections 406, 456 with the terminals 402, 440 according to the appropriate radio communication standard, as discussed above. The operation of the record/log module 454 will be discussed below in connection with reference to flow charts in FIGS. 5 to 10, in terms of operational methods as implemented by computer software instructions executed by a control unit (CPU) 458 and with use of a memory unit 460 in which the software is present.

Turning now to FIGS. 5 to 10, methods will be described that exemplifies the way in which the invention provides effects and advantages relating to controlling charging in ad hoc networks. Where appropriate, references will be made to the devices and units described above and schematically illustrated in FIGS. 1 to 4.

Figure 5:
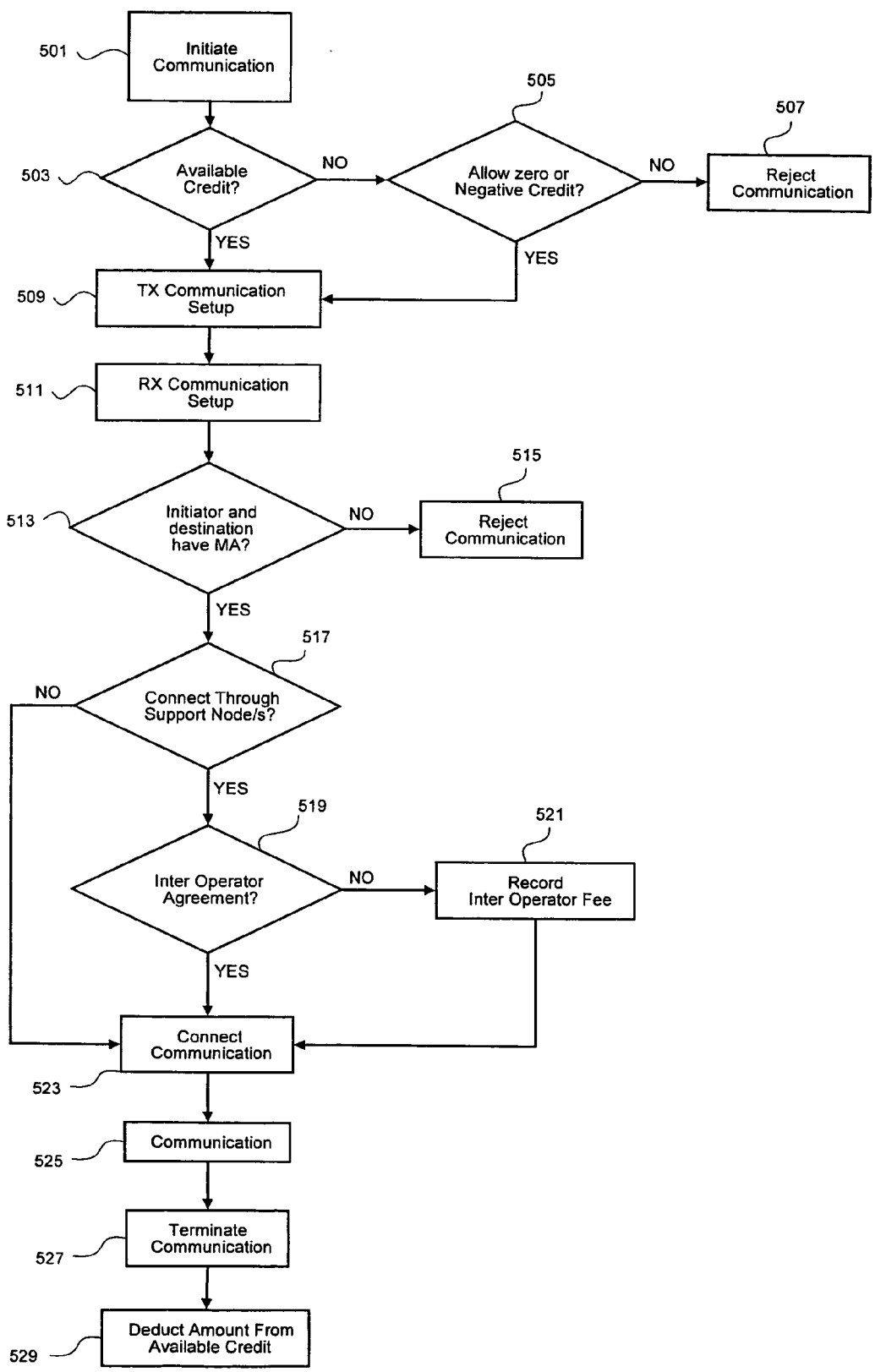
FIG. 5 is a flow chart of steps performed during communication between two mobile terminals in an ad-hoc network.

FIG. 5 shows the steps of a method involving an ad hoc connection between a first communication terminal and a second communication terminal, such as any of the terminals described above in connection with FIGS. 2 to 4. Unless stated otherwise, all steps are performed in a first mobile terminal.

In an initiation step 501, an event has occurred that triggers an attempt to establish a direct connection with a second terminal without using any communication resource in a cellular or wireless network. The triggering event may be one in which a user has selected, e.g. via a user interface, a telephone number or any other data that identifies the destination to establish a connection with the second terminal.

Before attempting to establish the connection a check is made whether or not the first terminal is to be allowed to attempt the connection. This is performed in a credit check procedure consisting of a first checking step 503 and a second checking step 505. Here, a decision is made based on the financial status of the first terminal as represented by a credit level. The credit level is stored in the first terminal in such a manner that it is protected from manipulation and may be either in "positive terms", such as in a situation where the first terminal is configured with a prepaid subscription, or in "negative" terms, such as in a situation with a subscription involving regular billing of used credits. If both checking steps 503 and 505 results in a discovery that there is no available credit (step 503) and that a zero credit or negative credit is not allowed (step 505), the attempt to establish the connection is rejected in a rejection step 507. The rejection step may include any procedure to tell the user that the communication attempt is rejected, for example by displaying an appropriate message on a display of the first terminal.

If the attempt to establish the connection is allowed, due to there being available credit in the terminal, a communication setup procedure takes place involving transmission of signalling data between the first terminal and the second terminal. This signalling exchange takes place in the first terminal in setup step 509 and in the second terminal in a setup step 511.

In a further checking step 513, a check is made both in the first terminal and in the second terminal whether or not there exists a mutual agreement (MA) regarding use of ad hoc communications between the network operator with which the respective terminals are associated and the respective terminals. For example, the first terminal checks it's smart card and the second terminal checks it's smart card and then signals the result to the first terminal. If neither the first nor the second terminal have a mutual agreement (MA) with it's associated network operator, the communication is rejected in a rejection step 515. Alternatively a check is performed whether the initiating terminal has a mutual agreement (MA) or not, regarding the use of ad hoc communications, with the network operator that the initiating terminal is associated with. If the initiating terminal doesn't have a mutual agreement (MA) with the associated network operator, the communication is rejected in a rejection step 515. Also this rejection step may include any procedure to tell the user that communication is rejected, for example by displaying an appropriate message on a display of the first terminal.

Then follows a procedure of establishing which and what type of path the communication is to follow between the first and the second terminal. In a support node check step 517, a check is made whether or not to use a support node. If it is found that usage of a support node is not allowed or if the user of the first terminal has decided not to use a support node, the procedure terminates and the communication is established, in a connection step 523, directly between the first and the second terminal, without use of a support node.

If the support node checks step 517 establishes that the first terminal is to use a support node/s, a check is made in a checking step 519 whether the operator with which the first terminal is associated has an agreement with one or more operators of the support node/s. Such an agreement may entail free usage or usage for a fee. Information regarding such an agreement is available in the first terminal and has typically been provided to the first terminal during connection setup. If it is found that no fee is to be applied, the procedure terminates and the communication is established, in the connection step 523, between the first and the second terminal, by using the support node. If it is found that there is to be applied a fee for usage of the support node, a fee is recorded in the first terminal during a fee recording step 521, where after the communication is established in the connection step 523, using the support node.

Communication then proceeds in a communication step 525 and the communication is terminated in a termination step 527.

After termination of the communication, the charging of the communication takes place in a charging step 529. For example, the charging may simply entail deducting a specific amount from a credit level value stored in the first terminal.

Figure 6:
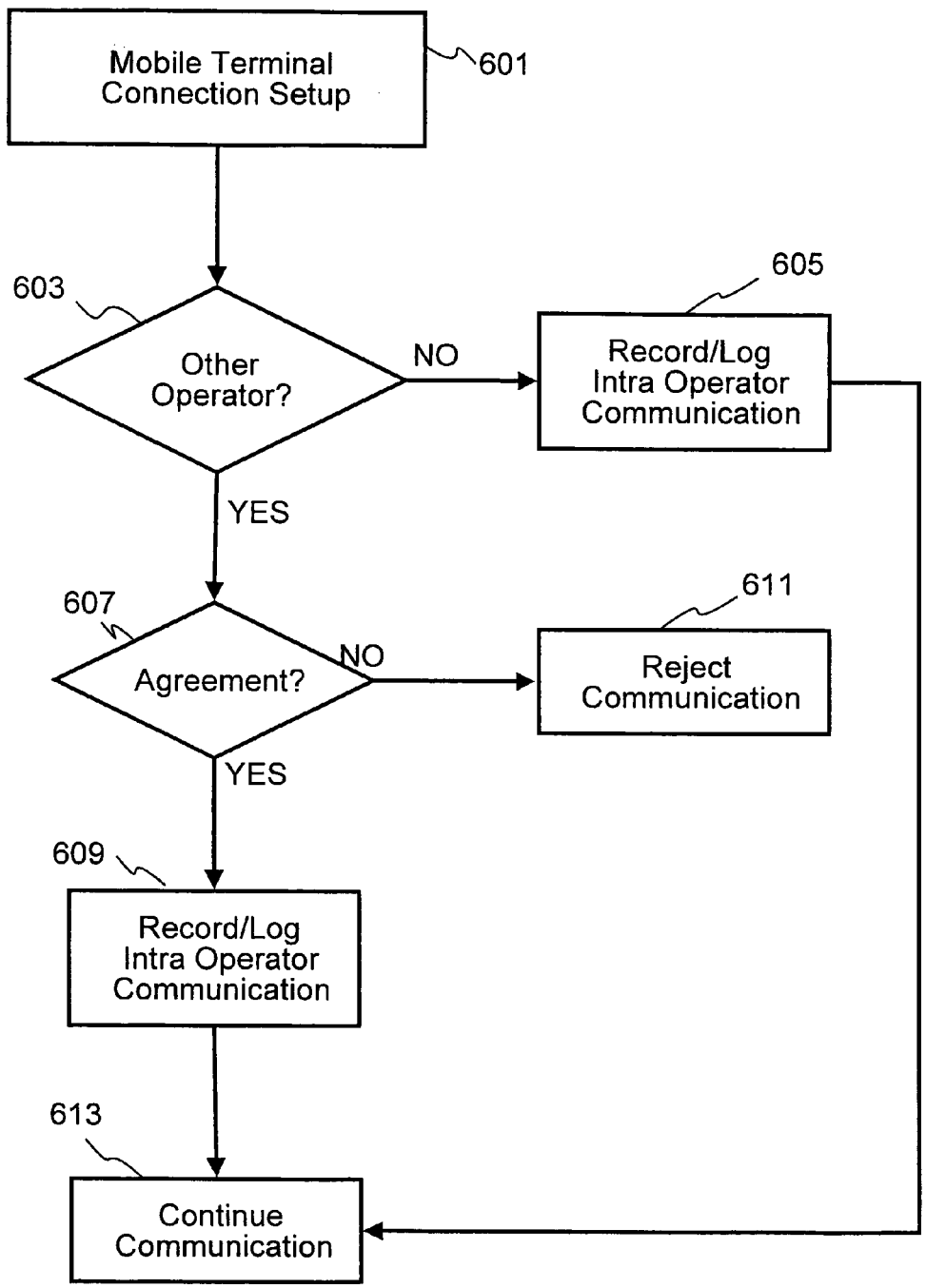
FIG. 6 is a flow chart of steps performed during communication in an ad-hoc network involving a support node.

Now, with reference to FIG. 6, a procedure will be described that takes place in a support node via which communication takes place between a first and a second mobile terminal. For example, the situation described above in connection with FIG. 4. The procedure is typically implemented by way of software instructions stored in a memory unit and executed by a control unit (CPU) in the support node.

In a connection step 601, the first terminal and the support node/s establish a connection by signalling, i.e. exchanging information such as identities and information regarding respective associations with a network operator. This association may be of a permanent type such as a paid subscription with a network operator or network provider. It can also be a temporary agreement that is established on an as needed basis, for example at a hotel or airport where access to the network is needed only for a limited time.

In a checking step 603, a check is made whether or not the operator with which the first terminal is associated is the same as the operator/s of the support node/s.

If it is found that the operator with which the first terminal is associated is not the same as the operator/s of the support node/s, a check is then made, in a further checking step 607, whether or not there exists an agreement regarding use of support node/s by the first terminal and the network operator with which the support node/s are associated. If there is no agreement, the communications are rejected in a rejection step 611.

If it was determined, in the checking step 603, that the operator with which the first terminal is associated is the same as the operator of the support node/s, logging information regarding the use of the support node/s is then stored in the support node/s in a logging step 605 and the communication between the terminals via the support node/s continue in a communication step 613.

If it was determined, in the checking step 607, that there is an agreement regarding use of support nodes between the first terminal associated with the first operator and the network operator with which the support node/s are associated, logging information regarding use of the support node/s are then stored in the support node/s in a logging step 609. The information that is logged includes at least information regarding the identity of the operator with which the first terminal is associated. The communication between the terminals via the support node/s continue in the communication step 613.

Now, with reference to FIG. 7, a procedure will be described that takes place in an accounting node and an access node in an operator network when a first terminal gets into contact with the operator network, typically after having performed one or more communications with other terminals. For example, the situation involving the arrangements described above in connection with FIG. 3. The procedure is typically implemented by way of software instructions stored in a memory unit and executed by a control unit (CPU) in the operator network, e.g. in the accounting node and in the access node.

In other words, this is a situation where charging takes place in a network, using information that has been stored in a terminal, typically on a smart card, and transmitted to the network.

In a connection step 701, the first terminal establishes contact with the operator network via the access node. In an initiation step 703, signalling is performed between the terminal and the network during which a request to perform a credit synchronization procedure is transmitted from the terminal to the accounting node.

Authentication then takes place in an authentication step 705 during which authentication information is exchanged between the terminal and the authentication module in the access node.

In a charging transfer step 707, charging information is then received in the accounting node from the terminal. The charging information may include, as already discussed, data relating to any ad hoc communications that the terminal have been performing. Furthermore, the charging information includes charging data relating to any ad hoc communications that have involved communication via one or more support nodes.

The charging information that has been received is then processed in the accounting node in a checking step 709. In the checking step 709 it is checked whether or not the charging data received amount to such a level that an available credit level is exceeded. If the credit level is not exceeded, or a zero credit or negative credit is allowed, continued use of the terminal for ad hoc connections is approved and no further actions are taken and the procedure ends in a termination step 711.

On the other hand, if it is found, in the checking step 709, that the charging data received amount to such a level that an available credit level is exceeded, continued use of the terminal for ad hoc communications is not approved. Alternatively, incoming communications might still be allowed, but no outgoing. Effectuation of this non-approval is made in a transmission step 713 at which a locking signal is transmitted from the accounting node to the terminal. As a reaction to the locking signal, when received by the terminal, the terminal performs an operation, in a locking step 715, that disables continued ad hoc communication use of the terminal, alternatively disables the terminal for outgoing communications.

Figure 7:
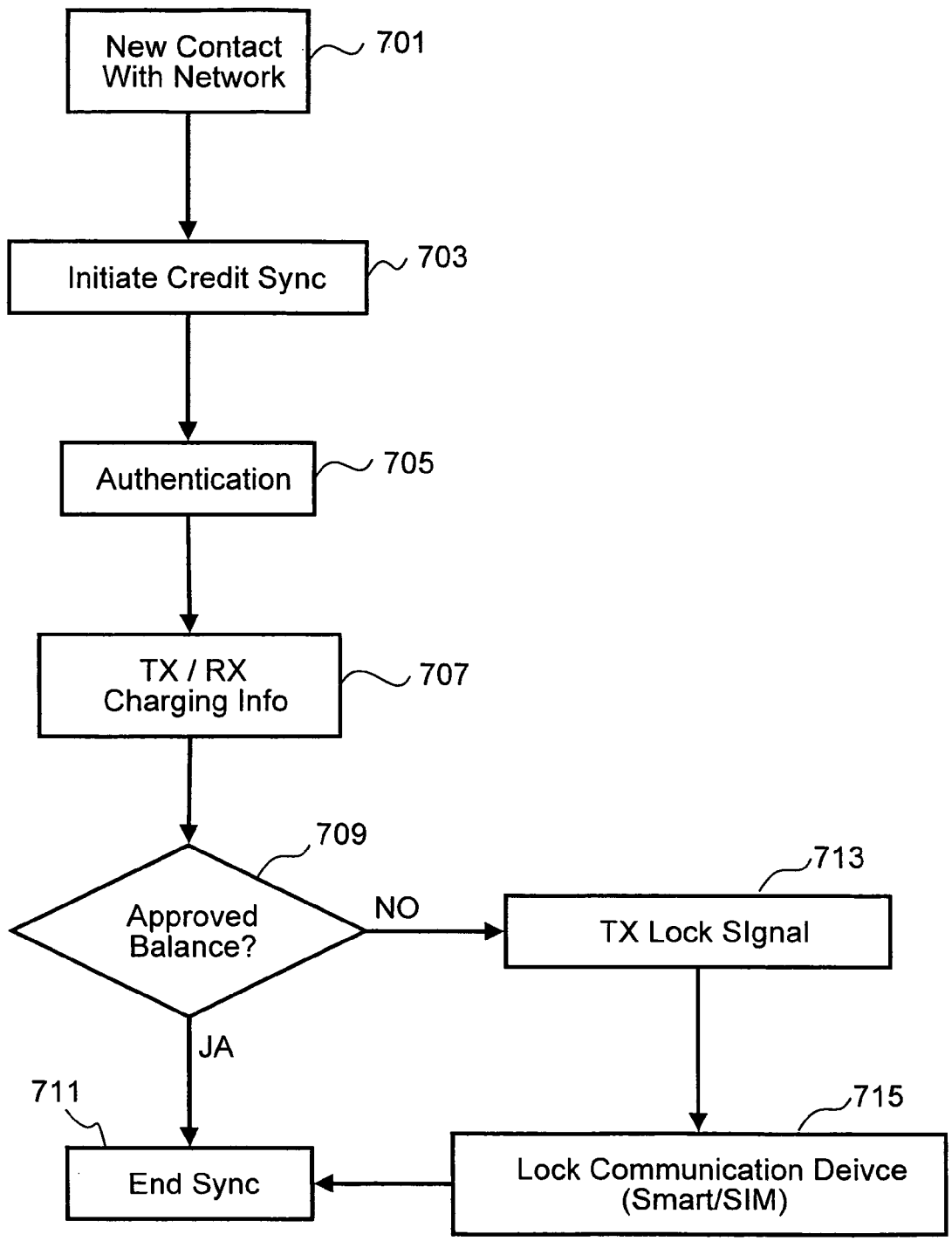
FIG. 7 is a flow chart of steps performed in an operator network in connection with communication in an ad-hoc network, specifically involving accounting.

In summary, a purpose of the procedure described with reference to FIG. 7 is to disable any terminal, alternatively only for outgoing communications, which has exceeded an approved credit level. Of course, the terminal may subsequently be re-charged by the user with additional credits, for example by using the procedure to be described below in connection with FIG. 8.

Figure 8:
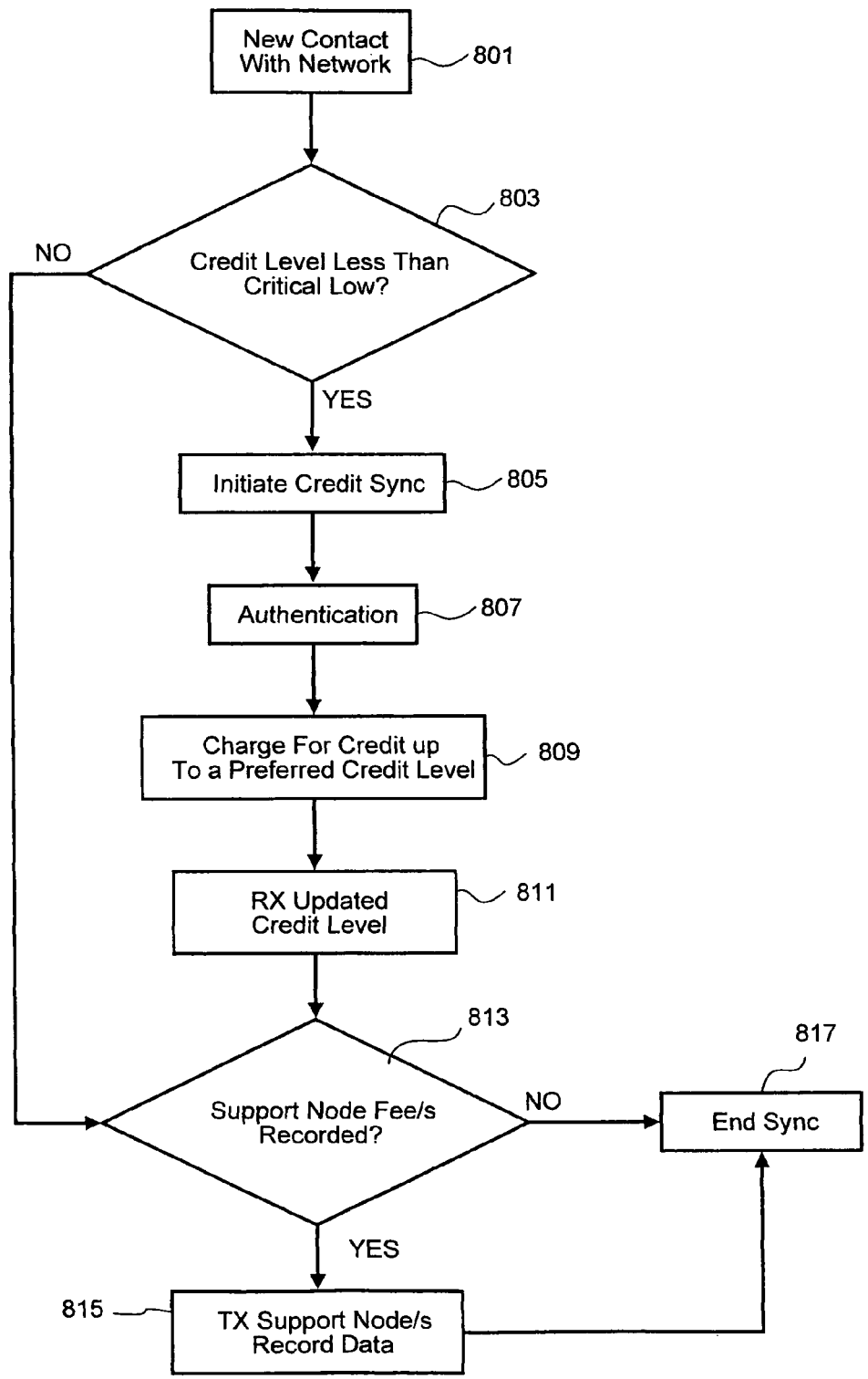
FIG. 8 is a flow chart of steps performed in a mobile terminal in connection with communication in an ad-hoc network, specifically involving charging.

Now, with reference to FIG. 8, a procedure will be described that takes place in a terminal when communicating with an accounting node and an access node in an operator network. The procedure is normally invoked when a user of the terminal, by the use of a profile specified by the user and operated by a software program, finds that a credit level is too low to allow further ad hoc communication or any other level at which a re-charge should take place, and as a consequence of this contacts the network with which the terminal is associated and obtains an updated credit level. It is typically very convenient to have a profile in the terminal that specifies when the terminal should connect to the network and update the credit level. The profile is typically configured such that it also specifies the desired credit level.

For example, this situation may involve the arrangements described above in connection with FIG. 3. The procedure is typically implemented by way of software instructions stored in a memory unit and executed by a control unit (CPU) in the terminal and in the operator network, e.g. in the accounting node and in the access node.

In a connection step 801, the first terminal establishes contact with the operator network via the access node.

If it is found in a checking step 803 that the credit level stored in the terminal is below a predetermined level, typically as defined in a profile as discussed above, an initiation step 805 is performed between the terminal and the network during which a request to perform a credit update procedure is transmitted from the terminal to the accounting node.

Authentication then takes place in an authentication step 807, during which authentication information is exchanged between the terminal and the authentication module in the access node.

Then, in a charging step 809, the accounting node processes the request for an updated credit level from the terminal. The resulting value of the credit level is then provided to the terminal in a transfer step 811 in which the terminal receives the updated credit level.

Following the transfer step, and if it was found in the checking step 803 that the credit level stored in the terminal is not below a predetermined level, a check is then made, in a checking step 813, whether or not there is charging information stored in the terminal that has resulted from a use of a support node during any previous ad hoc communication with other terminals. If such support node charges are present, information regarding these are then transmitted to the accounting node in a transmission step 815, whereupon the procedure is terminated in a termination step 817.

Figure 9:
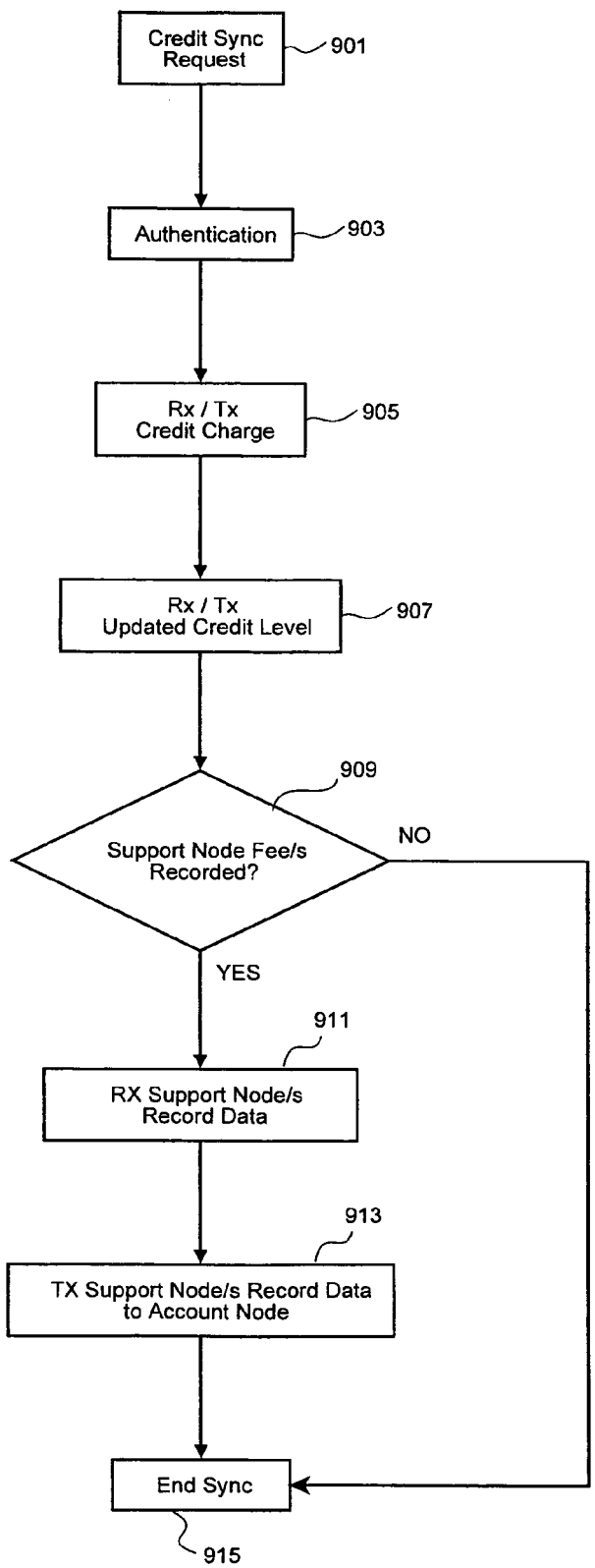
FIG. 9 is a flow chart of steps performed in an access node in connection with charging of a mobile terminal smart card account in an ad-hoc network.
Figure 10:
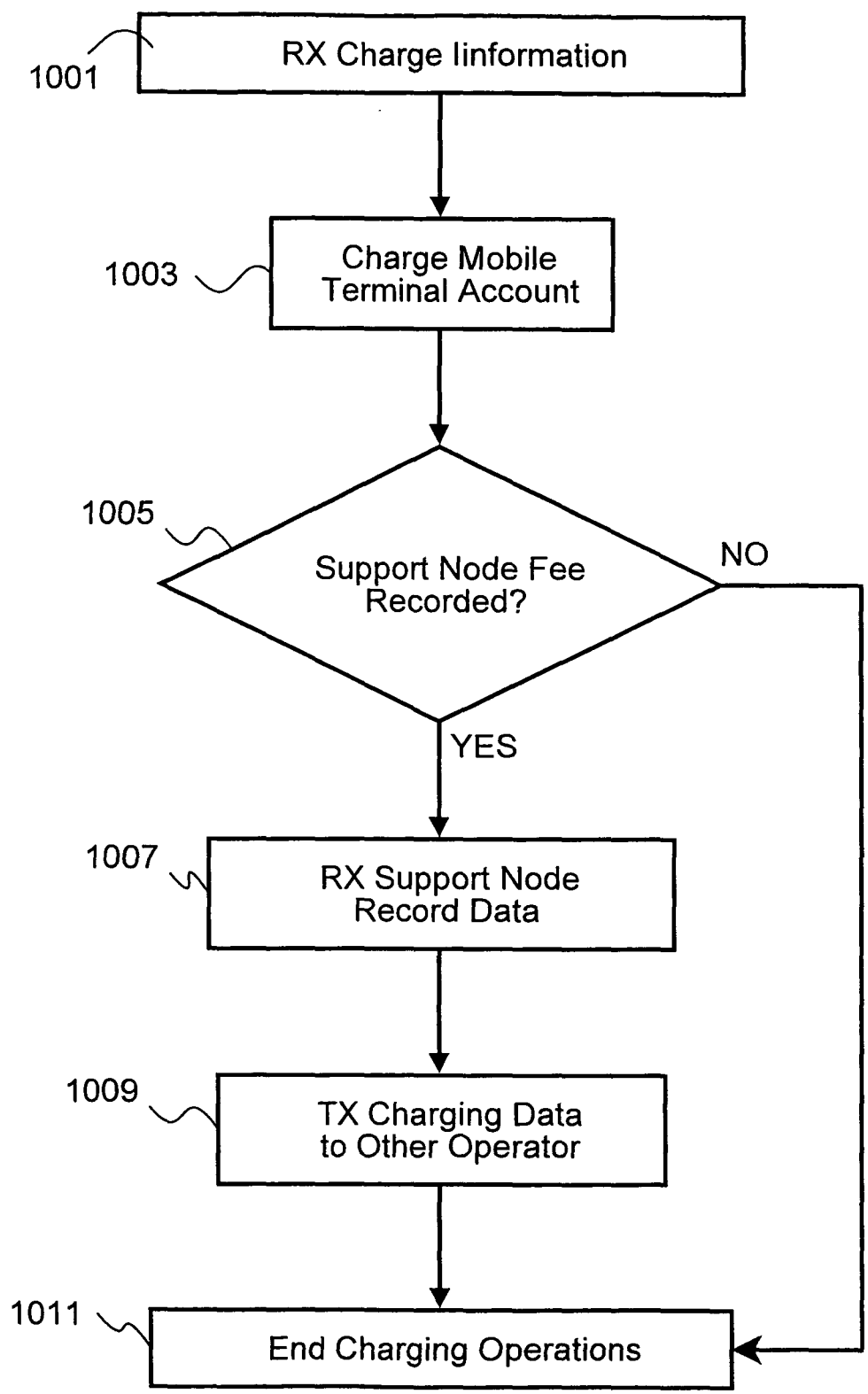
FIG. 10 is a flow chart of steps performed in an accounting node in connection with communication in an ad-hoc network.

Now, with reference to FIGS. 9 and 10, a procedure will be described that takes place in an accounting node and an access node when communicating with a terminal in an operator network. For example, a situation involving the arrangements described above in connection with FIG. 3. The procedure is typically implemented by way of software instructions stored in a memory unit and executed by a control unit (CPU) in the network, e.g. in the accounting node and in the access node.

In a request step 901, signalling is performed between the terminal and the network during which a request to perform a credit synchronization procedure is transmitted from the terminal to the access node.

Authentication then takes place in an authentication step 903 during which authentication information is exchanged between the terminal and the authentication module in the access node.

In a charge transfer step 905, charging information is then received in the accounting node from the terminal. The charging information may include, as already discussed, data relating to any ad hoc communications that the terminal have been performing. Furthermore, the charging information includes charging data relating to any ad hoc communications that have involved communication via one or more support nodes. The charging information is then transmitted to the accounting node.

In a second transfer step 907, an updated credit level is received from the accounting node and this information is then transmitted to the terminal.

If any charges related to the use of support nodes are included in the charging information, this is established in a checking step 909. If there are charges related to the use of support nodes, this information is obtained from the terminal in a reception step 911 and transmitted to the accounting node in a transmission step 913, whereupon the procedure ends.

The procedure that takes place in the accounting node, as a result of the transfer during the charge transfer step 905, will now be described.

In a reception step 1001, the charging information is received from the access node. This information is then processed and, after identifying which user account or subscription to charge, which is deduced from the received charging information that typically includes an identifier of the originating terminal and/or user account, the appropriate amount and account is charged in a charging step 1003.

If any charges relating to usage of support nodes are detected in the received charging information, in a checking step 1005, this support node usage information is obtained from the access node in a reception step 1007 and subsequently, in a transmission step 1009, transmitted to the appropriate support node operator. The support node operator to whom the support node usage charge data is transmitted is determined from the support node usage charge data in that it typically incorporates information regarding an identity of the support node operator. If no charges relating to usage of support nodes are detected, the procedure ends in step 1011.

The invention claimed is:

1. A method in a first mobile terminal for controlling charging of communication between the first mobile terminal and a second mobile terminal, the first mobile terminal being associated with a first network operator, the method comprising:
  generating charging information without access to an external network, the charging information being associated with communication between the first mobile terminal and the second mobile terminal, the communication being by way of an ad hoc wireless connection established between the first mobile terminal and the second mobile terminal where the ad hoc wireless connection is by one of:
  a) a wireless connection between the first mobile terminal and the second mobile terminal, or
  b) through a support node that is not reliant on a network backbone to support the ad hoc wireless connection between the first mobile terminal and the second mobile terminal, and
  the charging information, internally to the first mobile terminal, charges for the communication via the ad hoc wireless connection according to a mutual agreement with the first network operator,
  retaining the charging information securely in the first mobile terminal and without access by a user of the first mobile terminal, and
  analyzing a charging control profile in the first mobile terminal without access to an external network and, depending on the analysis, deciding whether or not to charge the communication within the first mobile terminal or to transfer the charging information to the first network operator when access to an external network is available,
  wherein the first mobile terminal is subject to the mutual agreement with said first network operator to permit the first mobile terminal to engage in the communication with the second mobile terminal via the ad hoc wireless connection, and disabling future communication via ad hoc wireless connections involving the first mobile terminal if the mutual agreement would be violated by future communication via ad hoc wireless connections.

2. The method according to claim 1, wherein the generation of charging information involves generation of charging information representing a chargeable activity relating to communication between the first and second mobile terminal.

3. The method according to claim 2, wherein the chargeable activity comprises either an initiation of the communication between the first and second mobile terminal, or an initiation and a reception of the communication between the first and second mobile terminal.

4. The method according to claim 2, wherein the chargeable activity comprises a duration of time or an amount of data communication between the first and second mobile terminal.

5. The method according to claim 1, wherein the generation of charging information is based on any of a prepaid billing system, a subscription based billing system, or a combination of these two billing systems.

6. The method according to claim 1, wherein the generation of charging information is joined with a billing system of an external communication system.

7. The method according to claim 1, wherein the retaining of charging information additionally involves storage in a protected storage area of the second mobile terminal that is protected from manipulation by a user of the second mobile terminal.

8. The method according to claim 1, wherein the retaining of the charging information involves storage in a smart card either in the first mobile terminal, or in the first and a second mobile terminal.

9. The method according to claim 1, wherein the analysis of the charging control profile comprises analyzing information that specifies that transfer of the charging information is to take place at a specific instant in time.

10. The method according to claim 1, wherein the analysis of the charging control profile comprises analyzing information that specifies that transfer of the charging information is to take place when the mobile terminal has access to a mobile terminal's operator network.

11. The method according claim 1, wherein the generation and the retaining of the charging information involve updating an available credit level.

12. The method according to claim 11, wherein the updating of the available credit level involves updating credit level data in the mobile terminal.

13. The method according to claim 11, further comprising:
the mobile terminal receiving credit level data from a mobile terminal's operator network.

14. The method according to claim 1, wherein the analysis of the charging control profile comprises analyzing information that specifies whether transfer of the charging information should be performed depending on whether an unplanned disruption of the communication between the terminals has occurred.

15. The method according to claim 1, further comprising:
checking whether a mutual agreement exists between the first mobile terminal and the first network operator and depending on the result permitting or rejecting the communication.

16. The method according to claim 1, further comprising:
checking whether a mutual agreement exists between a second mobile terminal and the first network operator or a second network operator and depending on the result permitting or rejecting the communication.

17. A method according to claim 1 comprising the steps:
initiating a communication in the first mobile terminal;
performing a credit level check in the first mobile terminal, the check setting a credit indicator;
depending on said credit indicator, permitting or rejecting the communication;
updating the credit level using the charging information.

18. A method according to claim 1 comprising the steps:
initiating a communication in the first mobile terminal;
performing a credit level check both in the first mobile terminal and in a second mobile terminal, depending on said check setting a credit indicator in at least the first mobile terminal;
depending on said credit indicator, permitting or rejecting the communication;
updating the credit level using the charging information.

19. A method according to claim 1, wherein the communication between the first and second mobile terminals includes communication via at least one support node and comprising:
receiving support node information including information regarding an association between the initiating mobile terminal and an operator of the support node,
analyzing the node information and, depending on the analysis, generating the charging information.

20. The method according to claim 19, wherein the analysis of the charging control profile comprises analyzing information that specifies an agreement between the terminal operator and the operator of the support node.

21. The method according to claim 19, wherein the analysis of the charging control profile comprises analyzing information that specifies that the generation of charging information includes generation of a node usage charge.

22. The method according to claim 21, wherein the generation of the charging information involves generating the node usage charge in case the analysis of the node information establishes that the support node operator is not associated with the first terminal operator.

23. The method according to claim 19, wherein the analysis of the node information involves establishing that a plurality of support nodes are involved in the communication and wherein the generation of the node usage charge involves generation of a node usage charge that depend on the number of support nodes involved.

24. The method according to claim 19, wherein the communication via the at least one support node is conditioned on results from an analysis of:
the maximum extra fee the mobile terminal user is willing to pay for a connection through support nodes,
the minimum capacity the mobile terminal user is willing to accept of a connection through support nodes.

25. The method according to claim 24, further comprising:
displaying, on the first mobile terminal, a graphical user interface and prompting for confirmation, if the only option available for a successful connection is to connect through the support nodes for a higher fee, or a lower capacity.

26. The method according to claim 19, wherein the communication via the at least one support node is conditioned on results from an analysis of:
the willingness of connecting through another external communication system,
the maximum extra fee the mobile terminal user or mobile terminal users are willing to pay for a connection through the external communication system,
the minimum capacity the mobile terminal user is willing to accept of a connection through the external communication system.

27. The method according to claim 26, further comprising:
displaying, on the first mobile terminal, a graphical user interface and prompting for confirmation, if the only option available for a successful connection is to connect through the external communication system for a higher fee, or a lower capacity.

28. A method in a support node for controlling charging of communication between a first mobile terminal and a second, the first mobile terminal being associated with a first network operator, the method comprising providing, to the first mobile terminal,
support node information including information regarding an association between the initiating mobile terminal and an operator of the support node, the provided information intended for analysis in the first mobile terminal as claimed in claim 19.

29. A method according to claim 28, wherein information regarding the communication between the first and the second mobile terminals are logged for record keeping in a secure storage area inside the support node, wherein
the logged records being configured to be retrieved remotely through the providers or operators network,
the logged records being configured to be retrieved remotely through another providers or operators network,
the logged records being configured to be retrieved remotely through an ad hoc communication network,
the logged records being configured to be retrieved locally at the support node by direct access to the secure storage area.

30. A method in a communication network for controlling charging of communication between a first mobile terminal and a second mobile terminal, as claimed in claim 1, comprising:
receiving charging information from the first mobile terminal, and/or
receiving charging information from the second mobile terminal,
analyzing the received charging information.

31. A method in one or more mobile terminals for controlling a credit level associated with charging of communication in a network as claimed in claim 1, the mobile terminal being associated with a network operator, comprising:

determining that the credit level is to be updated, based on the determination, accessing the communication network and requesting an updated credit level, obtaining, from the communication network, an updated credit level.

32. A method in a communication network for controlling a credit level in one or more mobile terminals associated with charging of communication in the network as claimed in claim 1, the mobile terminal being associated with an operator of the network, comprising:

receiving a request regarding an updated credit level from the terminal, determining whether to accept the request, and depending on the determination, providing an updated credit level to the mobile terminal.

33. A mobile terminal comprising communication and control means that are configured to perform a method according to claim 1.

34. A support node comprising communication and control means that are configured to perform a method according to claim 28.

35. A mobile network comprising communication and control means that are configured to perform a method according to claim 30.

36. A mobile terminal comprising communication and control means that are configured to perform a method according to claim 31.

37. A communication network comprising communication and control means that are configured to perform a method according to claim 32.

38. A non-transitory computer readable medium in the form of a memory storing a computer program comprising software instructions that, when executed by a processor in a mobile terminal, performs a method according to claim 1.

39. A non-transitory computer readable medium in the form of a memory storing a computer program comprising software instructions that, when executed by a processor in a support node, performs a method according to claim 28.

40. A non-transitory computer readable medium in the form of a memory storing a computer program comprising software instructions that, when executed by a device in a communication network, performs a method according to claim 30.

41. A non-transitory computer readable medium in the form of a memory storing a computer program comprising software instructions that, when executed by a processor in a mobile terminal, performs a method according to claim 31.

42. A non-transitory computer readable medium in the form of a memory storing a computer program comprising software instructions that, when executed by a device in a communication network, performs a method according to claim 32.

43. The method according to claim 1, wherein the charging information charges for the communication via the ad hoc wireless connection by deducting from a credit balance and the charging information is transferred if the credit balance drops below a predetermined amount.

44. The method according to claim 43, wherein the disabling is triggered under the mutual agreement if sufficient credit for the future communication is not present.

45. The method according to claim 1, wherein the disabling is triggered by a message that is received from the external network following transfer of the charging information.

* * * * *

UNITED STATES PATENT AND TRADEMARK OFFICE
CERTIFICATE OF CORRECTION

PATENT NO.      : 8,594,625 B2                     Page 1 of 1
APPLICATION NO. : 12/441759
DATED           : November 26, 2013
INVENTOR(S)     : Plymoth et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 663 days.

Signed and Sealed this

Twenty-second Day of September, 2015

Michelle K. Lee
*Director of the United States Patent and Trademark Office*